United States Patent [19]

Alcorn, Jr. et al.

[11] 4,209,838

[45] Jun. 24, 1980

[54] ASYNCHRONOUS BIDIRECTIONAL INTERFACE WITH PRIORITY BUS MONITORING AMONG CONTENDING CONTROLLERS AND ECHO FROM A TERMINATOR

[75] Inventors: Thomas E. Alcorn, Jr., San Juan Capistrano; James L. Konsevich, Mission Viejo, both of Calif.

[73] Assignee: Sperry Rand Corporation, New York, N.Y.

[21] Appl. No.: 752,236

[22] Filed: Dec. 20, 1976

[51] Int. Cl.² .................... G06F 9/18; G06F 3/04
[52] U.S. Cl. ........................................... 364/200
[58] Field of Search ... 364/200 MS File, 900 MS File; 340/147 LP

[56] References Cited

U.S. PATENT DOCUMENTS

| | | | |
|---|---|---|---|
| 3,237,164 | 2/1966 | Evans | 364/200 X |
| 3,242,467 | 3/1966 | Lamy | 364/200 |
| 3,425,037 | 1/1969 | Patterson et al. | 364/200 |
| 3,470,542 | 9/1969 | Trantanella | 364/200 X |
| 3,668,651 | 6/1972 | Hornung | 364/200 |
| 3,710,324 | 1/1973 | Cohen et al. | 364/200 |
| 3,800,287 | 3/1974 | Albright | 364/200 |
| 3,818,447 | 6/1974 | Craft | 364/200 X |
| 3,832,692 | 8/1974 | Henzel et al. | 364/200 |
| 3,866,181 | 2/1975 | Gayman et al. | 364/200 |
| 3,886,524 | 5/1975 | Appelt | 364/200 |
| 3,911,409 | 10/1975 | Kowal et al. | 364/200 |
| 3,983,540 | 9/1976 | Keller et al. | 364/200 |
| 3,997,896 | 12/1976 | Cassarino, Jr. et al. | 364/200 |
| 4,096,572 | 6/1978 | Namimoto | 364/200 |
| 4,106,104 | 8/1978 | Nitta et al. | 364/900 |

*Primary Examiner*—Melvin B. Chapnick
*Attorney, Agent, or Firm*—B. Franklin Griffin, Jr.; Eugene T. Battjer; William E. Cleaver

[57] ABSTRACT

An interface which connects input/output (I/O) controllers to a data channel in a data processing system. A bidirectional priority bus is provided interconnecting the channel with the controllers. Each controller is assigned a priority level. When a controller requires service, it signals the channel over a common request line and the channel responds with a channel select signal. Each requesting controller gates a binary number corresponding to its priority level onto the common priority bus. Contending controllers resolve priority among themselves by monitoring the priority bus. If a controller detects a higher priority level than its own level on the bus it removes its priority number from the bus. The highest priority controller then activates an acknowledge signal and places its device address on a bidirectional data bus in response to a ready signal from the channel.

9 Claims, 7 Drawing Figures

CONTROL UNIT

ASYNCHRONOUS BIDIRECTIONAL INTERFACE WITH PRIORITY BUS MONITORING AMONG CONTENDING CONTROLLERS AND ECHO FROM A TERMINATOR

BACKGROUND OF THE INVENTION

1. Field of the Invention

The invention relates to data communication systems and more particularly to an input/output interface interconnecting a data processing system with peripheral devices.

2. Description of the Prior Art

Data processing systems include data channels which control the simultaneous exchange of data between many input/output (I/O) devices and common shared storage. The input/output devices are attached to the data channel through a number of control units. The control unit adapts the characteristics of different I/O devices to a standard form of control and transfers data and control information to the data channel over a common shared I/O interface on a time division multiplex basis. In order to accommodate computer installations wherein a varying number of control units may be attached to the interface cable, an asynchronous control is necessary because the length of cables varies. Also, since more than one control unit may contend for access to the shared data bus, priority levels must be assigned to the control units and means must be provided for resolving priority among contending control units.

One of the most widely used asynchronous interfaces is the IBM System/360 I/O interface which is described in an IBM Systems Reference Library Manual entitled "IBM System/360 I/O Interface Channel to Control Unit" Form A22-6843-3. The IBM System/360 I/O interface provides a data information format and a control signal sequence definition which is common to all control units attached to a data channel. The rise and fall of all signals transmitted in one direction over the interface are controlled by interlocked responses in the opposite direction.

Control unit selection and priority determination is controlled by a "select out" line which forms a chain from the channel through each control unit to a cable terminator. A selection priority is established by the position of a control unit on the cable. Thus, the control unit closest to the channel end of the cable has the highest priority whereas the control unit farthest from the channel has the lowest priority. Priority can be changed only by changing the position of a control unit on the cable by either physically moving the control unit or by rerouting the cables between control units. A selection priority is established because the rise of "select out" is effective only to the first control unit in the chain. If a control unit does not require service the "select out" line is propagated to the next control unit down the cable. The priority is thus in a descending sequence from the channel through each control unit.

When any control unit requires service it raises "request in" to the data channel. The channel raises "select out" which is propagated from the highest priority control unit to the lowest until a control unit intercepts the select out line and seizes priority. The control unit thus granted priority places the address of the I/O device on "bus in" and raises both "address in" and "operational in". When the channel recognizes the address, a "command out" line is energized to the control unit indicating that the control unit can proceed. After the control unit has dropped "address in" the channel responds by dropping "command out" thus ending the control unit initiated sequence. Separate sequences are utilized for data transfer operations and for status information transfer operations.

The data transfer rate on an interface of this type is limited to the speed of the circuits and the length of the cable connecting the channel with the control unit.

Furthermore the above-described interface has the disadvantage that the priority assignment for control units is fixed by the position of the control unit and cannot be easily altered.

SUMMARY OF THE INVENTION

It is a paramount object of this invention to provide an asynchronous interface which can operate over long distances with a small number of signal lines.

It is a further object of this invention to provide an improved interface wherein priority selection among contending users of the interface is automatically determined on the basis of priority levels assigned to each contender.

Briefly, the above objects are accomplished in accordance with the invention by providing a bidirectional bus which comprises a plurality of common priority lines connected to each controller, each controller being assigned a unique priority level designated by a binary-coded number. Each controller requiring service activates a request line to the data channel. The data channel responds to the request by energizing a channel select line to all the controllers. Each contending controller which has raised its request line responds to the activation of the channel select line by gating its priority number onto the common priority lines. Each controller responds to the levels of the priority lines by removing its priority number from the lines upon the condition that a higher priority number is detected. Thus only the priority number of the controller which has the highest priority among contending controllers remains on the bidirectional bus. The controller then acknowledges to the channel that a priority determination has been made. The controller has thus gained access to the shared data bus.

In accordance with an aspect of the invention the problem of varying propagation times due to cable lengths is resolved by providing a priority signal which is released by a control unit in response to the channel select signal. The priority signal is returned to the channel as an echo pulse from the terminator at the end of the interface cable to thus indicate that the priority level has traveled to the terminator and back to the channel.

The invention has the advantage that control units can be placed at a variable distance from the channel without losing information from controllers which are slow in responding.

The invention has the further advantage that priority can be assigned to any control unit regardless of its position on the I/O interface.

The invention has the further advantage that additional sequences are not necessary to present address information and status information concerning devices because this information is availaable on the priority bus.

The foregoing and other objects, features and advantages of the invention will be apparent from the following more particular description of a preferred embodiment of the invention as illustrated in the accompanying drawings.

IN THE DRAWINGS

INTRODUCTORY DESCRIPTION OF THE PRIOR ART

Figure 1:
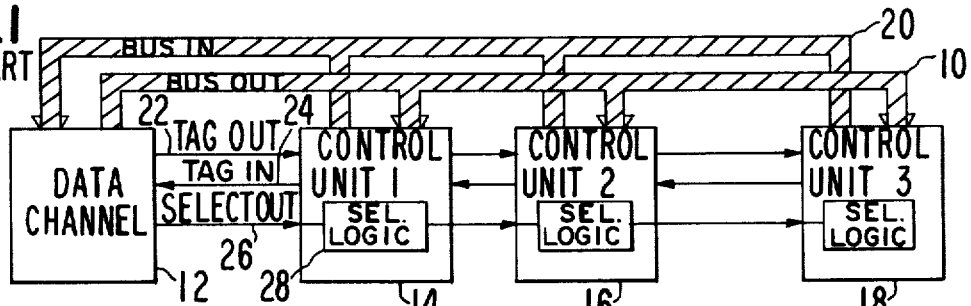
FIG. 1 is a block diagram of a prior art communication system.

Referring now to FIG. 1, a simplified block diagram of the IBM System/360 I/O interface is illustrated. This interface is more fully described in the above-identified IBM Systems Reference Library Manual. The interface comprises a plurality of bus out lines 10 from the channel 12 to a plurality of control units 14, 16, 18. This bus carries information from the channel to the control units. A second bus in 20 is provided to carry information from the control units to the channel. A plurality of parallel tag out lines 22 are provided from the channel to all the control units in parallel and a plurality of tag in lines 24 are provided from all of the control units to the channel. A select out line 26 is provided for priority selection. The select out line is a line from the channel to the control unit that has the highest priority (i.e., control unit number 1) and from any control unit to the control unit next lower in priority. If a control unit does not require selection as determined by the selection logic 28, it propagates the select out signal to the next control unit.

Figure 2:
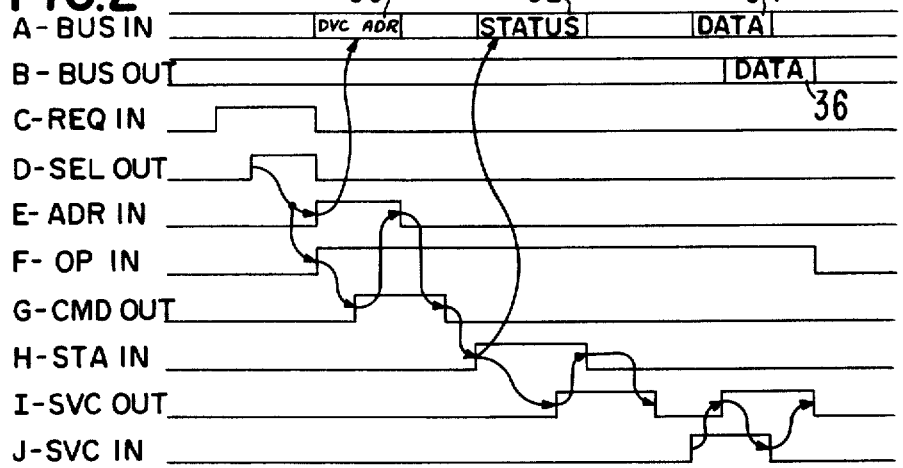
FIG. 2 is a timing diagram illustrating the operation of the prior art system of FIG. 1.

Referring now to the timing diagram of FIG. 2, a typical operation of the System 360 interface will be described. When any control unit requires service it raises request in to the channel (waveform C). When the channel is free to handle requests from the control units it raises select out (waveform D). The highest priority control unit which has raised request in stops the propagation of select out to the next lower control unit and in this manner seizes control of the busses 10 and 20. The control unit then places the device address 30 on bus in (waveform A) and raises address in (waveform E). The device also raises operational in (waveform F) which signals to the channel that an I/O device has been selected. Operational in stays up for the duration of the selection and the device selected is identified to the channel by the address placed on bus in. When the channel recognizes the address it energizes command out (waveform G). The control unit is now free to drop address in and the channel responds to this by dropping command out to thus complete an interlocked sequence of priority selection. Status information 32 is transmitted over bus in to the channel by the control unit placing the information on the bus and raising the status in line (waveform H). The channel accepts this information by raising service out (waveform I). Once service out has risen the control unit is free to drop status in, in response to which the channel drops service out. Data 34 may be transmitted from the control unit to the channel over bus in or data 36 can be transmitted from the channel to the control unit over bus out.

If data is to be transmitted from the control unit to the channel, the control unit places the data 34 on bus in and raises service in (waveform J). The channel accepts the data by raising service out which signals the control unit that the data has been accepted and the control unit drops service in and removes the data from bus in. The channel is now free to drop service out and this ends the sequence. If no more data or status information is to be transmitted operational in is dropped thus disconnecting the control unit from the common buses.

If data is to be transmitted from channel to the control unit the control unit raises service in, the channel places the data 36 on bus out and signals with service out. The channel maintains the validity of bus out until service in falls after which the channel responds by dropping service out thus completing the sequence. The control unit preserves a logical connection after the channel has permitted the control unit to disconnect by dropping select out, by maintaining the operational in line energized for the duration of the data or status information transfer.

DESCRIPTION OF THE PREFERRED EMBODIMENT OF THE INVENTION

Figure 3:
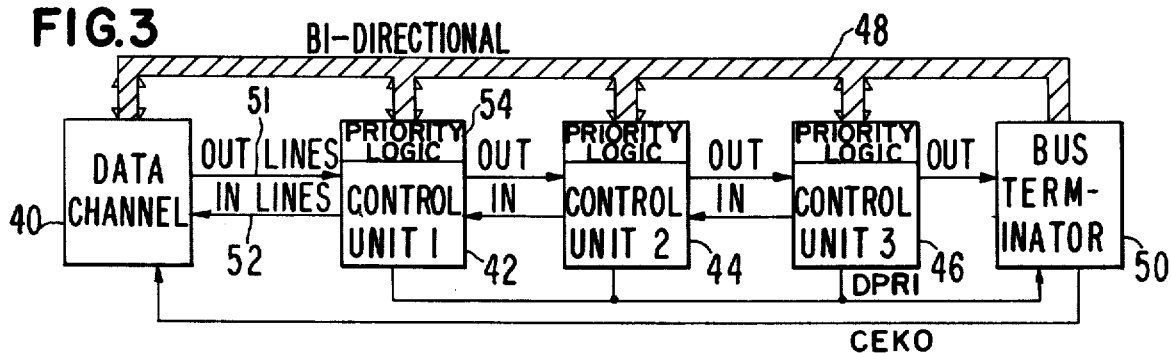
FIG. 3 is a block diagram of a communication system in which the present invention is embodied.

Referring now to FIG. 3 a simplified block diagram of a channel to control unit interface constructed in accordance with the present invention is illustrated. Information to and from a data channel 40 and a plurality of control units 42, 44, 46 is provided over a bidirectional bus 48. A plurality of out lines 51 and in lines 52 are provided which connect all of the control units in parallel with the data channel for effecting control sequences. In addition a terminator circuit 50 is provided at the end of the input/output cable to return one of the lines, a channel select line, CDSL, as an echo pulse CEKO. CEKO is an echo from the bus terminator to the channel which indicates that the terminator is echoing the channel selection line. As an alternative, a line DPRI is released by each controller after the controller has finished determining priority. DPRI is sent back to the channel by the terminator as CEKO. In either case the CEKO line indicates the length of the bus to the channel during priority determination. This allows any length bus to be utilized.

Figure 4:
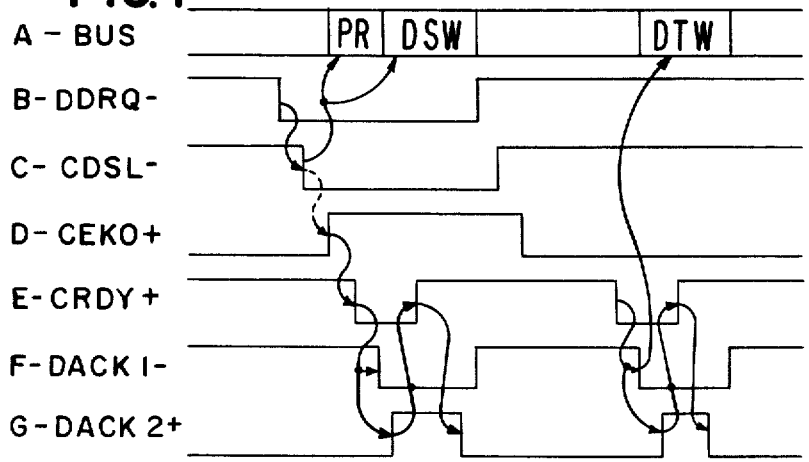
FIG. 4 is a timing diagram illustrating the operation of the system of FIG. 3.

The waveforms of FIG. 4 illustrate a typical priority selection and data transfer sequence over the interface. One or more control units initiate a sequence by activating DDRQ— (waveform B). The data channel responds to DDRQ— by activating CDSL—. Each requesting unit responds to CDSL— by enabling a device status word (DSW), which includes a priority number, onto the data bus and enabling the priority logic 54 to determine the highest priority device which is requesting service. The channel waits until it receives CEKO (waveform D) which will be returned when the CDSL— (or in an alternative embodiment DPRI+) signal arrives at the bus terminal 50. This is the time required for one round trip bus delay. The channel then delays a fixed amount of time after receiving CEKO+ to allow the priority logic circuits to settle before activating the channel ready (CRDY+) line shown in waveform E. The control unit with the higest priority as determined by the priority logic responds to CRDY+ by activating device acknowledge 1 (DACK 1−) and device acknowledge 2 (DACK 2+). The control unit with the highest priority maintains its DSW on the data bus. All the other control units respond to CRDY+ by activating DACK 2+. All of the lower priority requesting control units remove their DSW information from the data bus after having made the determination that another control unit has the higher priority.

The channel responds to DACK 1− and DACK 2+ by removing CRDY+. The control units not of highest priority respond to the removal of CRDY+ by removing only DACK 2+. The control unit with the highest priority responds to the removal of CRDY+ by removing its data request DDRQ−, DACK 1−, DACK 2+, and its DSW from the data bus. The channel responds to removal of DACK 1− by removing CDSL− thus completing the status word transfer phase of the sequence.

A data transfer word (DTW) can now be transferred to the channel from the control unit or from the control unit to the channel. The channel starts the sequence by energizing CRDY+. All control units, including those that do not have priority, respond to CRDY+ by activating only DACK 2+. The control unit with priority places its DTW on the bus and activates DACK 1−. The channel responds to DACK 1− and DACK 2+ by reading in the DTW and then removing CRDY+. All of the control units respond to the removal of CRDY+ by removing DACK 2+. The selected control unit responds to the removal of CRDY+ by removing the DTW from the data bus and by removing DACK 1− and DACK 2+, thus completing the data transfer sequence.

A comparison between the prior art interface and the interface constructed in accordance with the invention shows that the invention has the advantage of utilizing fewer lines to perform the same transfer of information with the additional advantage that by utilizing an echo pulse any length bus can be used without loss of information. Furthermore, by using a bidirectional bus fewer bus lines are needed. In the prior art interface shown in FIG. 1 bus in and bus out are never utilized simultaneously; that is, data is either being transferred from the control unit to the channel or from the channel to the control unit but never simultaneously, therefore one bus is always idle during a transfer.

The invention has the further advantage that fewer tag out and tag in lines are needed. For example, to present status information the status word of all requesting control units is placed on the bus during the priority determination part of the cycle. That is, the priority information contained within the DSW for all devices is placed simultaneously on the bus 48 when the signal CDSL− from the channel is activated. After a priority settling time the bidirectional bus contains only the DSW of the device which is determined to be of the highest priority. Therefore, an additional status sequence utilizing a "status in" line as described with reference to the prior art is not necessary when practicing the present invention. The device address is presented to the channel along with the status information all in one operation upon the fall of CDSL−. In the prior art, the device address is presented to the channel by activating "address in" and is accepted by the channel by the activation of "command out". A separate sequence is provided for transferring status information by raising "status in" which is accepted by the channel by raising of "service out". These separate time consuming sequences are eliminated by the present invention.

In accordance with an aspect of the invention two device acknowledge lines are utilized to signal the channel. Device acknowledge 1 is energized only by the highest priority control unit to the channel. During an output transfer, this signal active indicates that the control unit has accepted the word on the data bus. The channel maintains the word on the data bus until the trailing edge of DACK 1−. During an input transfer DACK 1− active indicates that the control unit has enabled a word onto the data bus for transfer to the channel. During a priority determination the DACK 1− signal active indicates that a contending control unit has enabled its DSW onto the bidirectional data bus. When DACK 2+ is activated this indicates that the highest priority contending control unit has enabled its DSW onto the bus.

Device acknowledge 2 indicates that all control units are responding to channel ready. At the end of a priority determination sequence DACK 2+ active indicates that the priority number of the highest priority contending device is on the data bus. The interlocking provided by these two device acknowledge signals provides sufficient information to the channel so that it is aware at all times of the nature of the information which is presently on the bidirectional data bus.

DETAILED DESCRIPTION

Figure 5:
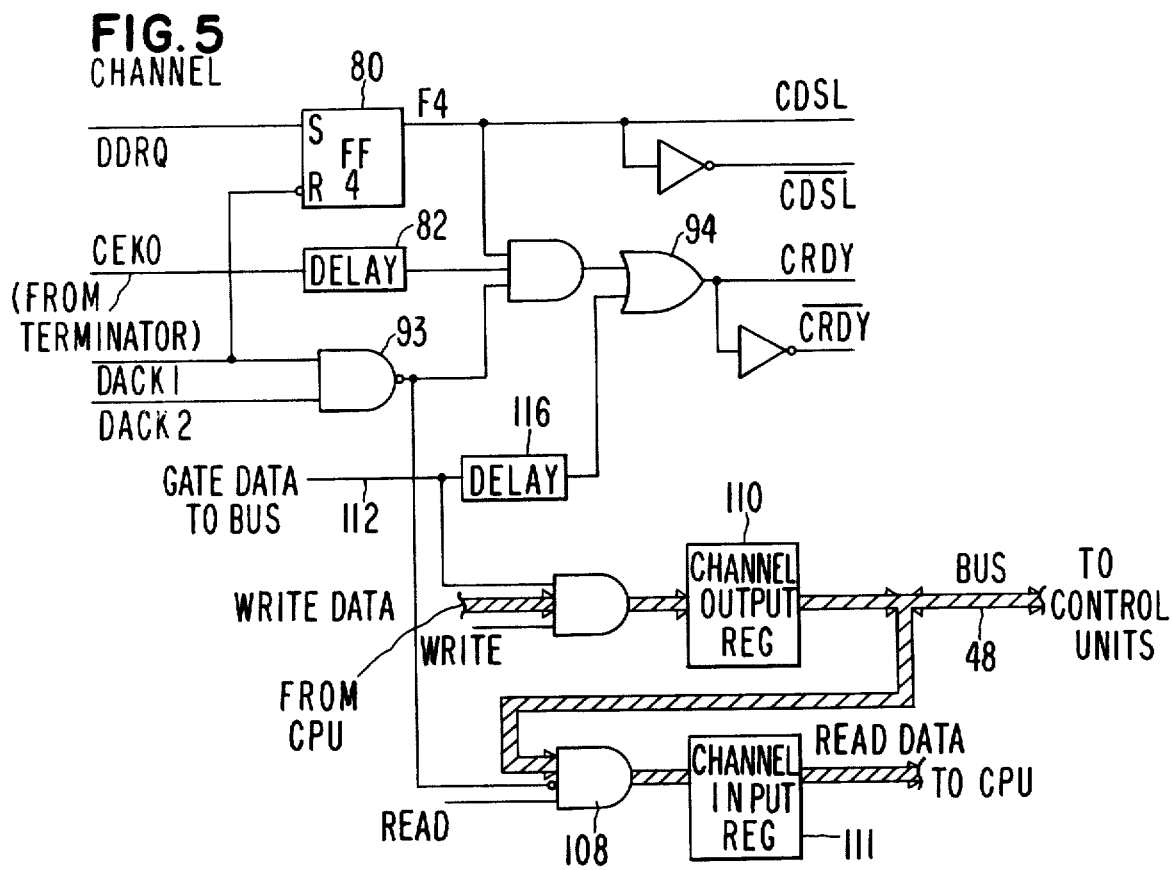
FIG. 5 is a more detailed block diagram of the logic circuitry in the channel for implementing the control sequences of the invention.
Figure 7:
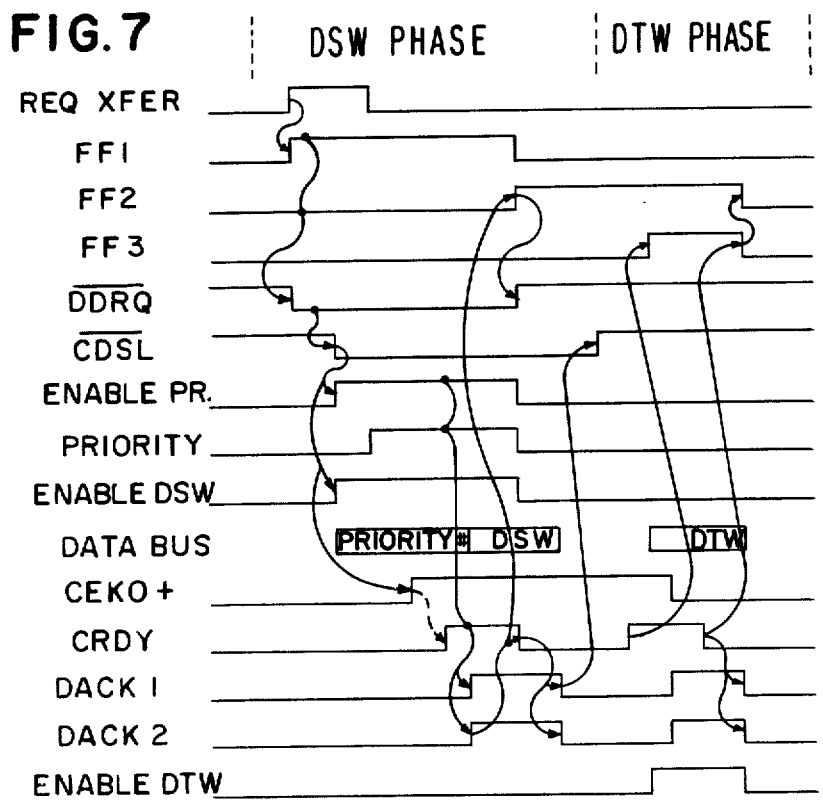
FIG. 7 is a timing diagram for the logic of FIGS. 5 and 6.
Figure 6:
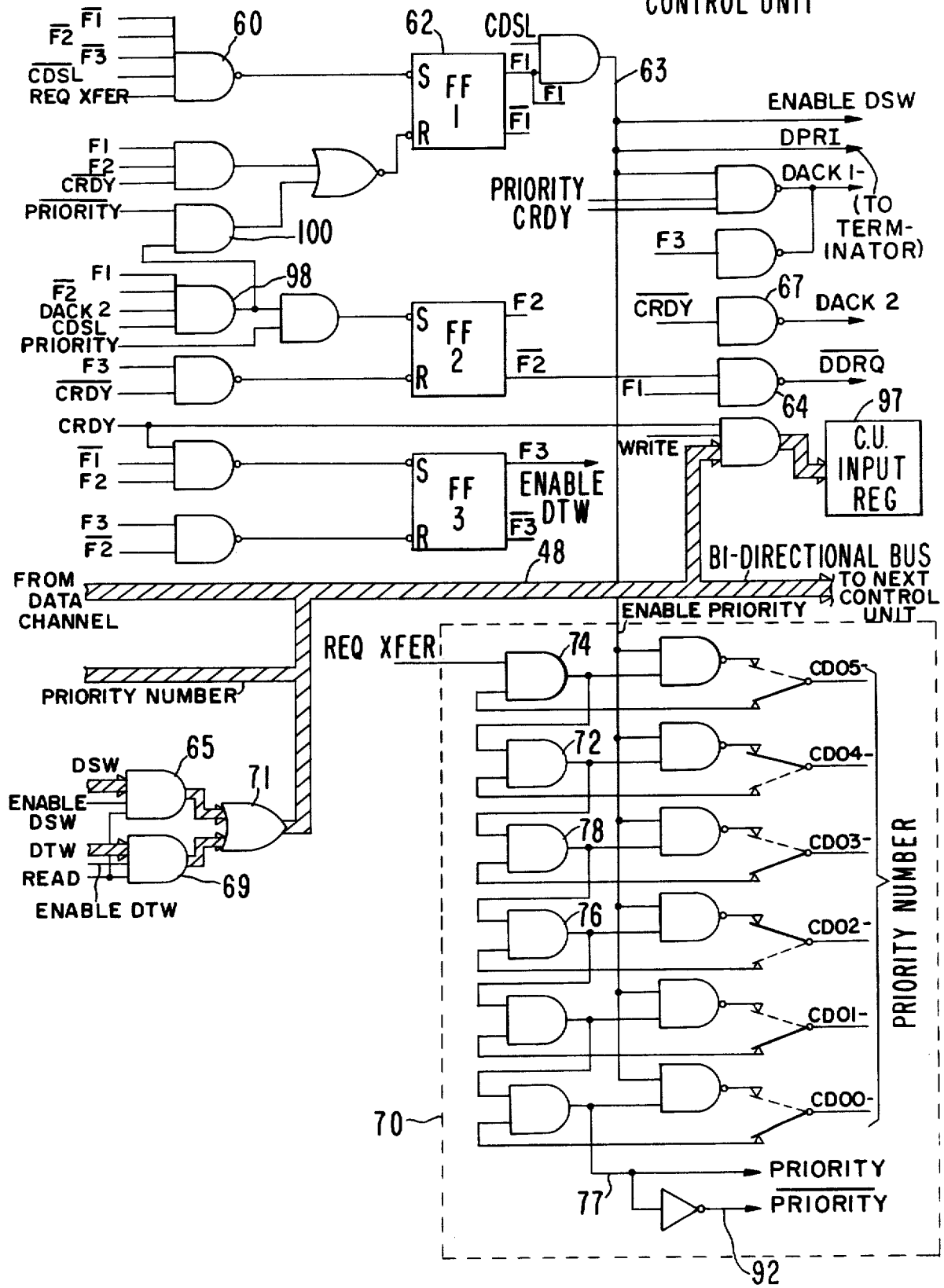
FIG. 6 is a more detailed block diagram of the logic circuitry in the controller for implementing the control sequence and priority determination.

Referring now to FIGS. 5, 6 and 7, a detailed description of control logic in both channel and control unit for performing the interface sequences will now be described. Referring to FIG. 6, the control unit initiates a priority determining sequence by raising the request transfer line into NAND circuit 60. The output of the NAND circuit 60 drops, thus turning on flip-flop 62. This causes the F1 line into NAND circuit 64 to go positive causing the output of this NAND circuit to drop thus energizing the DDRQ interface line.

Referring to FIG. 5, the channel responds to DDRQ by turning on flip-flop 80. The output F4 of flip-flop 80 activates interface line CDSL which is returned to the control units. Each requesting control unit responds to CDSL by activating the enable priority line 63. This gates the device status word (DSW) via AND circuit 65 to the bidirectional bus 48. The enable priority line also energizes the priority circuit 70 so that the priority number stored in the priority circuit by means of the switches CD00-CD05 can be compared with the priority number of other control units competing for priority.

The priority circuit 70 shown within the broken lines of FIG. 6 operates as follows. The switches CD00-CD05 are configured in each control unit to a unique number which indicates the priority level of the individual control unit. The priority tree is shown with priority number 14 set into the switches. If the control unit shown is the only one presenting priority, after the enable priority line has been energized the output bus 48 will hold the number 14.

If a contending control unit has a priority which is less than ten, the switch for CD04 on the priority circuit of the contending device is in the position shown by the dotted line. Since the illustrated device drives CD04 low and the contending device receives CD04 into its AND circuit 72, the outputs of all the lower order NAND circuits (CD03 through CD01) on the contending device will be disabled and after the settling time, the priority bus holds the number 14.

If the contending control unit has a priority of 20 or larger, the switch for CD05 on the contending control unit is in the position shown by the dotted line. Since the contending control unit drives CD05 low and the illustrated control unit receives CD05, the drivers for CD04 through CD00 on the illustrated control unit are disabled by the output of AND circuit 74. After the settling time the priority bus will hold the priority number of the contending control unit.

If the contending control unit has a priority greater than or equal to ten but less than 14 the switch for CD02 on the contending control unit is in the position shown by the dotted line. Since the illustrated control unit drives CD02 and the contending control unit receives CD02, the drivers for CD01 and CD00 on the contending control unit are disabled through the action of AND circuit 76 and after the settling time the bus will again hold the number 14.

If the contending control unit has a priority greater than 14 but less than 18, both control units drive CD04 and CD02 with the contending control unit driving either CD01 or CD00. Since the illustrated cntrol unit receives CD01 and CD00 the priority signal on that device is low signifying that the contending control unit has high priority.

If the contending control unit has a priority greater than 18 but less than 20, the switch for CD03 on the contending control unit is in the position shown by the dotted line. Since the illustrated control unit receives CD03 the AND circuit 78 disables all lower order AND circuits and after the settling time the bus holds the priority of the contending control unit.

Referring again to FIG. 7, the bus terminator 50 shown in FIG. 3 returns a signal CEKO+ which indicates the length of the bus to the channel during the priority determination. CEKO+ can be generated in two ways. In one embodiment CEKO+ is generated in response to energization at the bus terminator 50 of the CDSL output line. Thus once the CDSL pulse has traveled down the length of the cable it is returned to the data channel as CEKO+. This embodiment is illustrated in the timing diagram of FIG. 7. Under this embodiment a requirement of the circuits is that the control units contending for the bus must respond immediately to CDSL by connecting the priority tree 70 to the bus. Under this embodiment there is no mechanism by which the control units can signal that they had in fact connected to the bus. It is not sufficient to have the CEKO+ signal pass back through all of the control units to allow the control units to control this signal. Even if all control units controlled CEKO+ the connect time would not be determinable in the case of a slow device close to the processor on a long bus. If the device inhibited CEKO+ until it had connected its priority tree, the channel would detect CEKO+ immediately but the new priority would not have traveled to the terminator and back to the channel. An alternative embodiment to make the bus truly asynchronous is to provide one more signal, a device priority signal DPRI+ that is released by each control unit when responding to CDSL−. This signal then travels to the terminator and is returned as CEKO+ instead of returning CDSL− as in the first embodiment described above. This insures that the echo pulse is only returned to the channel after the priority trees of all control units have been attached to the bus thus ensuring complete interlocking between the control unit and the channel.

Once CEKO+ has been received by the channel (FIG. 5) it is delayed in delay circuit 82 to allow for priority settling. A typical delay would be 400 nanoseconds. The channel then activates CRDY+ which indicates to the device that it can proceed. The device with the highest priority has its priority line 77 activated and responds to CRDY+ by raising the device acknowledge lines DACK 1− and DACK 2+. This control unit maintains its priority number on the output bus 48. All other control units respond to CRDY+ by activating only DACK 2+ through NAND circuit 67. Flip-flop 2 is turned on at this point in the control unit which has been granted priority. The control units which have not been granted priority respond to CRDY+ or more specifically to DACK 2+, and through AND circuit 98 and AND 100, now enabled by the priority signal on lead 92, reset flip-flop 62. This removes the enable DSW line thereby removing the DSW from the bidirectional bus.

The channel responds to DACK 1 and DACK 2 by removing CRDY through the action of OR circuit 94. The control unit which has been granted priority responds to the removal of CRDY by removing DDRQ, DACK 1, DACK 2 and by resetting the flip-flop 62 thus removing the DSW from the data bus.

The channel responds to the removal of DACK 1− by resetting flip-flop 80 thus removing CDSL− from the interface. This completes the DSW phase of operation wherein the priority determination is made and the placing of the DSW and the priority number of the highest priority device on the data bus is effected.

A data transfer phase of operation is initiated by the data channel. Data can be transferrd either out to the control units or in to the channel.

Data Transfer Out

The data channel initiates the Data Transfer Word (DTW) phase by enabling the data transfer word onto the bidirectional bus by energizing the write line and the gate data to bus line 112 which transfers the data into the channel output register 110. A short delay measured by delay circuit 116 causes the CDRY line to be activated. The control unit with the highest priority responds to CRDY by transferring the DTW into the control unit input register 97 and activating DACK 1− and DACK 2+. All other control units not having priority respond to CRDY+ by activating DACK 2. The channel then responds to DACK 1− and DACK 2+ by removing CRDY+. The selected control unit responds to removal of CRDY+ by removing DACK 1− and DACK 2+. The sequence is thus complete and the channel removes the DTW from the data bus.

Data Transfer In

The data channel initiates a data transfer in (read) operation by activating the read line and gate data to bus line 112. This causes CRDY to rise. The controller having priority responds to CRDY+ by placing the data transfer word onto the bus via AND 69 and OR 71 and activating DACK 1− and DACK 2+. This is accomplished by turning on flip-flop F3 which causes the enable DTW line to rise. All other control units respond to CRDY by only activating DACK 2+. The channel receives DACK 1− and DACK 2− through NAND circuit 93, the output of which drives AND circuit 108 which gates the data on the bus into the channel input register 111. All other control units respond to the removal of CRDY+ by removing DACK 2+. The control unit with the highest priority responds to the removal of CRDY by removing the data transfer word from the bus and by removing DACK 1— and DACK 2+ thus completing the data transfer sequence.

SUMMARY

What has been described is an asynchronous interface that transfers information between the data channel of a data processing system and a number of peripheral control units. Bidirectional data bus lines transmit data transfer words and priority numbers between the control units and the data channel. Unidirectional control lines synchronize the transfer and indicate the type of transfer that is taking place. Interlocked sequences of the control lines insure that no data information is lost.

Each control unit is assigned a unique priority level designated by a binary coded number. This number can be changed thus changing the priority level of a device without the necessity of rerouting cables. Priority is determined when two or more devices raise a common request line and thus compete for access to the common shared bidirectional bus. The data channel responds to the request line with a select line which causes the control units to determine priority amongst themselves by examining the priority numbers present on the bidirectional bus. The control units which have lower priority respond to the priority bus by removing their priority numbers from the bus. The control unit with the highest priority number leaves its number on the bus and also gates a data status word onto the bus for transfer to the channel. An echo pulse is returned to the channel to indicate that the signals have transferred the entire length of the interface cable. This allows any length cable to be used because the data channel will not respond until the signals have settled down. In response to the echo pulse, the data channel energizes a channel ready signal which signals the control unit having the highest priority. The control unit acknowledges receipt of the channel ready signal by transmitting an acknowledgement signal to the channel which then responds by removing the ready signal. The status word is removed from the bus and the data transfer sequence then takes place.

Data transfer is initiated by the channel by again energizing the channel ready line. If information is to be transferred from the channel to the control unit the channel places the data on the bus. If the reverse direction of data transfer is to take place, the control unit responds to channel ready by placing a data word on the bus. In either case the control unit signals data transfer by activating the acknowledgement signal lines. The channel responds to the acknowledgement signals by reading in the data and then removing the ready signal thus indicating that the data transfer is complete.

While the invention has been particularly shown and described with reference to preferred embodiments thereof, it will be understood by those skilled in the art that various changes in form and details may be made therein without departing from the spirit and scope of the invention.

What is claimed is:

1. An asynchronous interface system comprising:
   an interface cable;
   a channel unit connected to said interface cable;
   a terminator connected to said interface cable at a physical end thereof;
   a plurality of control units connected to said interface cable between said channel unit and said terminator;
   first means in each control unit for applying a request signal to said interface cable when the control unit requires service;
   first means in said channel unit responsive to a request signal on said interface cable for applying a select signal to said interface cable;
   second means in each control unit responsive to a select signal on said interface cable for placing a priority number and a priority signal on said interface cable if the control unit is one requiring service, said second means in each control unit requiring service controlling the second means in each of the other control units requiring service so that all the priority numbers are removed from said interface cable except for the priority number of the highest priority control unit requiring service;
   means in said terminator responsive to a priority signal on said interface cable for applying an echo signal to said interface cable;
   second means in said channel unit responsive to an echo signal on said interface cable for generating a ready signal;
   third means in each given control unit responsive to a ready signal on said interface cable for generating a first acknowledge signal and, if said given control unit is the highest priority control unit requesting service, also generating a second acknowledge signal, said first and second acknowledge signals being applied to said interface cable; and,
   third means in said channel unit responsive to said first and second acknowledge signals for terminating said ready signal.

2. An asynchronous interface system as claimed in claim 1 and further comprising:
   fourth means in each given control unit responsive to a select signal on said interface cable for placing a status word for the given control unit on said interface cable; and,
   fifth means in each given control unit for terminating operation of said fourth means in the given control unit when said given control unit generates said first acknowledge signal.

3. A system for determining priority among a plurality of controllers connected to a data channel unit, comprising:
   a bidirectional bus including a plurality of common priority lines connected to each controller, each controller being assigned a unique priority level designated by a binary-coded number;
   a request line;
   means in each controller for applying a request signal to said request line upon the condition that the controller requires service;
   a select line connected from said data channel unit to all of said controllers in parallel;
   means in said data channel unit connected to said request line for applying a select signal to said select line in response to a request signal on said request line;
   means in each controller connected to said select line for gating signals representing the priority number of said controller onto said common priority lines and a status word onto said bidirectional bus upon the condition that said controller requires service;

priority determining means in each said controller connected to said priority lines for removing said priority number signals from said lines upon the condition that higher priority number signals from another controller are detected on said lines, whereby only the priority number signals of the controller which has the highest priority among contending controllers remain on said bidirectional bus; and, means in each controller for terminating the status word applied to said bidirectional bus if the controller does not have the highest priority among those contending for priority.

4. A system in accordance with claim 3 and further comprising:
a priority signal line;
said controllers each including means responsive to a select signal on said select line for releasing said priority signal line upon the condition that the signals representing a priority number have been placed on said bidirectional bus; and,
means in said data channel unit responsive to release of said priority signal line for generating a channel ready signal.

5. A system in accordance with claim 3 wherein each of said priority determining means includes a plurality of priority switch means connected to said bus in order from high order to low order positions on said bus, said switch means receiving signals in one state or transmitting signals in another state, each said priority determining means further including means for inhibiting transmission of signals from a lower order priority switch upon the receipt of a signal by a higher order priority switch.

6. A system including an asynchronous interface cable interconnecting a channel unit with a plurality of control units comprising:
a first plurality of lines for transmitting signals from said control units to said channel unit, said lines including a request line, a first acknowledge line, and a second acknowledge line;
a second plurality of lines for transmitting signals from said channel unit to said control units, said lines including a select line and a ready line;
a priority bus interconnecting said channel unit and said control units;
a terminator at the physical end of said interface cable interconnecting said control units, responsive to signals on said select line for generating an echo signal in response to a select signal being received at the end of said cable;
an echo line connected between said terminator and said channel unit;
means in each control unit responsive to signals on said select line for applying signals representing a priority number indicative of the priority level of said control unit to said priority bus, said means including means for applying a request signal to said request line;
means in said channel unit responsive to a request signal on said request line for applying a ready signal to said ready line;
means in said channel unit responsive to an echo signal on said echo line for applying a ready signal to said ready line;
priority determining means in each control unit, the priority determining means in any given control unit being responsive to priority signals on said priority bus for removing the signals representing the priority number of said given control unit from said bus and for applying a first acknowledge signal to said first acknowledge line upon the condition that said given control unit has a lower priority number than the priority number of another control unit requesting service;
means in each said control unit for applying signals to both said first and said second acknowledge lines upon the condition that the control unit is the highest priority control unit of all control units contending for service;
means in said channel unit connected to said first and second acknowledge lines and responsive to signals thereon for terminating said ready signal; and
means in each said control unit for terminating said first and second acknowledge signals when said ready signal is terminated.

7. The system in accordance with claim 6 wherein said first plurality of lines further includes a common priority line connecting said control units to said terminator and wherein said control units each include means connected to said select line for releasing said priority line upon the condition that a priority number has been placed on said bus, said terminator generating an echo signal in response to release of said priority line.

8. The system in accordance with claim 6 wherein said priority bus is bidirectional and wherein each said priority determining means includes a plurality of switch means connected to said priority bus in order from high order to low order positions on said priority bus, said switch means receiving signals in one state or transmitting signals in another state, each said priority determining means further including means for inhibiting transmission of signals from a lower order switch upon the receipt of a signal by a higher order switch.

9. The system in accordance with claim 6 further comprising:
a data transfer bus; and
means in each said control unit for gating signals representing an information word onto said data transfer bus in response to a select signal on said select line;
whereby the source of said information word is identified to said channel unit by means of said priority number.

* * * * *